Patented June 5, 1951

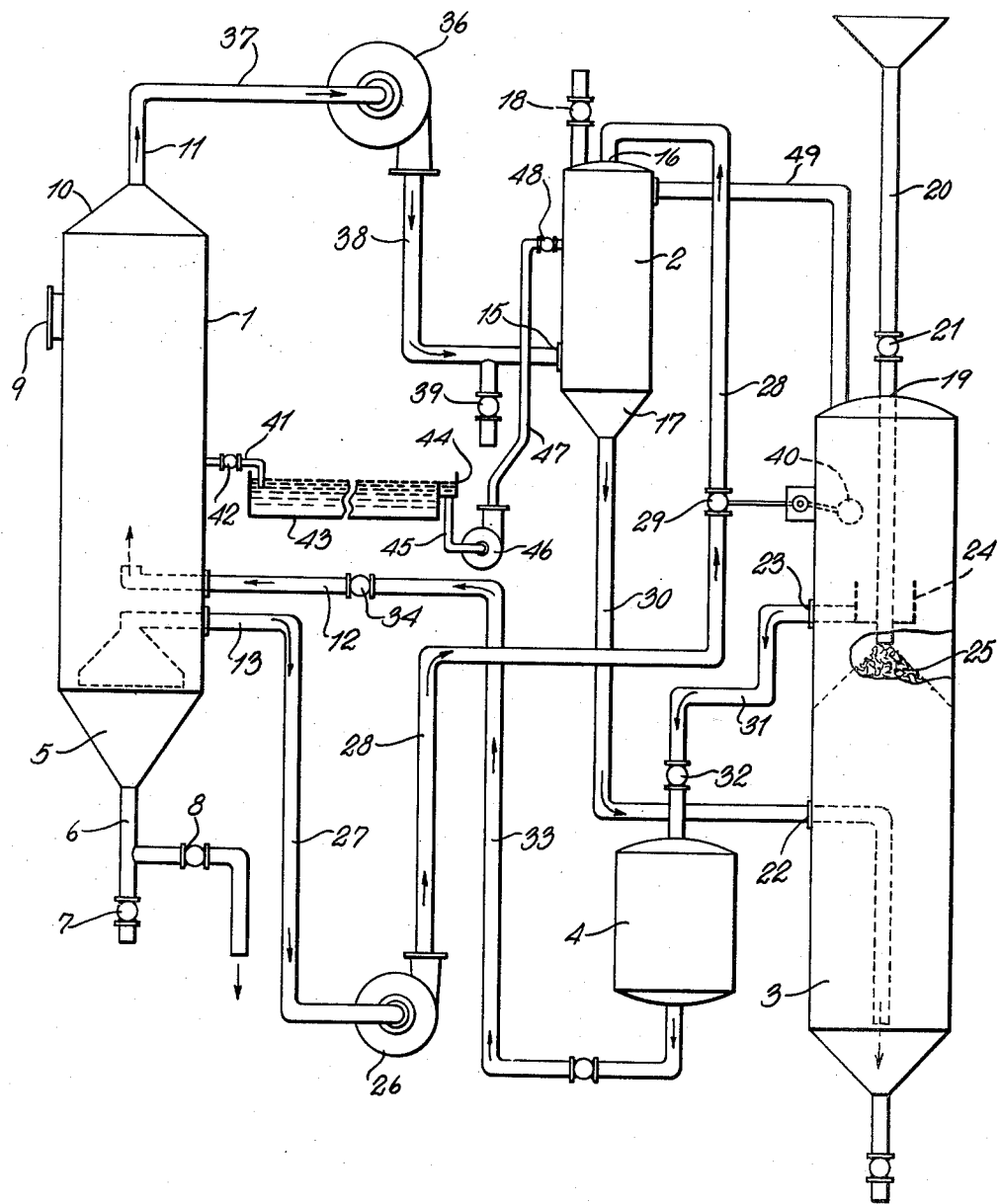

2,555,340

UNITED STATES PATENT OFFICE 2,555,340

METHOD AND APPARATUS FOR REFINING SALT OR OTHER SOLUBLE SUBSTANCES

Cecil M. Hopper, Ithaca, and Roman B. Richards, Watkins Glen, N. Y., assignors to International Salt Company, Scranton, Pa., a corporation of New Jersey Application June 18, 1945, Serial No. 600,030

16 Claims. (Cl. 23—295)

This invention relates to refining procedure and has for an object a continuous process for refining and recrystallizing impure salts or other soluble substances, the solubility of which increases with temperature.

According to this invention, salts or other soluble substances may be continuously leached under controlled conditions from impure substances and recrystallized in relatively pure form. More specifically, a solution crystallizing in an evaporator, is continuously removed therefrom and heated by direct contact with vapor from the evaporator in a vessel where the pressure and temperature are greater than in the evaporator. In the process of heating, the solution is diluted with condensed vapor after which the heated and diluted solution is brought to saturation by passage through a bed of impure substance. The saturated solution may be passed through a filtering medium to remove suspended solid particles and is returned to the evaporator through a flow control valve. In the passage of the solution through the valve, its pressure is reduced to the original pressure and due to the resulting evaporation and cooling, the dissolved substance crystallizes out of solution.

Other objects, novel features and advantages of this invention will become apparent from the following specification and accompanying drawing, wherein the single figure diagrammatically illustrates equipment for refining impure salts or other soluble substances according to our invention.

The equipment consists essentially of an evaporator 1, a heater 2, a saturator 3 and a filter 4. The evaporator consists of a cylinder composed of any suitable metal having a conical bottom portion 5 terminating in an emptying conduit 6 controlled by a suitable valve 7. A valve-controlled pipe 8 leads from the conduit 6 above the valve 7. In the vertical wall of the evaporator cylinder there is provided a manhole 9, by means of which access may be had to the interior of the cylinder. The top of the evaporator 1 is in the form of a cone 10 terminating in a vapor discharge pipe 11. The evaporator 1 is provided with an inlet opening 12 and an outlet opening 13 and the interior of the evaporator may contain such baffles as is necessary to direct the flow of the solution and crystals in any desired manner.

The heater 2 may be of any known design and construction so as to provide intimate contact between liquid and vapors and consists essentially of a vessel provided with a vapor inlet opening 15 and at its upper end with a liquid inlet 16 and at its lower end with a liquid outlet opening 17 together with a safety valve 18 at its upper end.

The saturator 3 consists essentially of a vessel or cylinder of appreciable height but relatively small diameter, the vessel being provided with a closed bottom and closed top. In the top of the saturator 3 there is provided an opening 19 through which passes a pipe 20 extending into the saturator to any suitable depth and having a control valve 21. The saturator is provided with an inlet 22 and an outlet 23 leading from a cup 24 supported by the lower end of the pipe 20 above the body of material 25 in the saturator.

The filter 4 may consist of any known type of filter suitable for operation under any pressure and containing such filtering medium as is adapted to filter out solids present in the liquid supplied thereto.

The outlet 13 of the evaporator is connected to the inlet of a pump 26 by a pipe 27 and the outlet of the pump 26 is connected to the liquid inlet 16 of the heater 2 through a pipe 28 provided with a valve 29. The outlet 17 of the heater 2 is connected through a pipe 30 to the inlet 22 of the saturator 3 and the outlet 23 of the saturator 3 is connected to the inlet of the filter 4 through the pipe 31 provided with a valve 32. The outlet of the filter 4 is connected to the inlet 12 of the evaporator 1 through the pipe 33 provided with a flow control valve 34.

The vapor discharge conduit 11 of the evaporator 1 is connected to the inlet of a compressor 36 through a pipe 37 and the outlet of the compressor 36 is connected through a pipe 38 to the vapor inlet 15 of the heater 2. A valve-controlled steam pipe 39 communicates with the pipe 38.

A float 40 is arranged in the upper part of the saturator 3 and through suitable connections controls the setting of the valve 29 in the pipe 28 to control flow of liquid from the evaporator 1 to the heater 2. The arrangement is such that upward movement of the float 40 tends to close the valve 29 while downward movement of the float tends to open said valve. A conduit 49 leads from the top of the saturator 3 to the top of the heater 2.

In the operation of the above equipment, the evaporator 1 is filled with solvent and the saturator 3 is filled with the substance to be refined up to a depth intermediate the inlet 22 and outlet 23. Sufficient solvent is also introduced into the saturator 3 to bring the level of solvent therein up to a height such that the float 40 is in its lowermost position and the valve 29 is open. The pump 26 is put into operation to withdraw liquid from the evaporator 1 and the withdrawn liquid is supplied through the inlet 16 to the upper end of the heater 2. Heated vapor is admitted to the heater from an outside vapor generator through the pipe 39 to start the heating cycle. Heated liquid flows from the outlet 17 of the heater 2 into the bottom of the saturator 3 and upwardly through the substance contained in the saturator. From the saturator 3, liquid flows through the filter 4 and valve 34 and inlet 12 into the evaporator 1. The control valve 34 is adjusted to produce the desired flow through the system and the liquid in the system is gradually brought up to the desired temperature by continuous circulation and while passing through the saturator 3 becomes saturated with solute from the material in the saturator and some vaporization of liquid occurs in the evaporator. The pressure in the heater 2 gradually rises to a point where it exceeds the pressure in the evaporator and upon the attainment of this condition, the compressor 36 is started. Addition of heated vapors through the pipe 39 is continued until the vapor discharged from the compressor 36 is at such pressure that the heat in the vapor upon its introduction into the heater 2 will heat the liquid supplied thereto to the desired temperature. At this point, the supply of outside vapor is discontinued and the cycle becomes self-sustaining. The liquid, after being heated and diluted by the condensed vapor in the heater 2, flows to the saturator 3 through the pipe 30 and the flow of liquid to the heater 2 is controlled through the valve 29 by the level of liquid in the saturator. The heated liquid is conducted through the pipe 30 into the bottom of the saturator 3 and flows upwardly through the bed of substance therein. The saturator 3 is of such size that the liquid becomes saturated during its passage through this bed. Substances in the bed insoluble at the temperature prevailing may be carried out thereof in suspension in the liquid. The saturated solution is collected at the upper part of the saturator 3 by means of the baffle 24 and is conducted through the pipe 23 to the filter 4 in which the suspended substances are filtered out by passage of the solution through the filter medium. From the filter, the solution passes by the pipe 33 through the control valve 34 where the pressure of the solution is lowered to that prevailing in the evaporator 1. The reduction in pressure in the saturated solution on passing through the control valve 34 causes part of the solvent to vaporize, and the mixture of vapor and solution passes into the evaporator 1 through the opening 12 and the pressure is still further reduced. The amount of vaporized solvent approximately equals the amount of solvent condensed in the heater 2. Such vaporization cools the introduced solution to the temperature existing in the evaporator 1. As the solubility of the solute in the solution is less at the lower temperature, some of the solute dissolved in the liquid in the saturator 3 crystallizes out. The crystalline solute on settling to the bottom of the evaporator is drawn out of the conduit 6 through the pipe 8, is separated from the solution in a known manner and the solution later is returned to the evaporator. The conduit 49 constitutes a vent from the saturator 3 to the heater 2 for equalizing the pressure in the two vessels and eliminating the collection of non-condensible vapors in the top of the saturator 3.

In the purification and re-crystallization of an impure salt such as sodium chloride, the evaporator is preferably operated at a pressure of zero pounds per square inch gauge and the compressor 36 preferably has a compression range of 30″ Hg to 74″ Hg absolute which is more than sufficient to supply the heat required to maintain the cycle self-sustaining. The system is filled with water and the saturator 3 is charged with rock salt 25 and steam from an outside source is admitted to the heater 2. On being recirculated, the water dissolves sodium chloride and calcium sulphate from the rock salt in the saturator and the resulting brine soon becomes saturated with respect both to sodium chloride and calcium sulphate and obtains a temperature of approximately 226° F. The compressor 36 is then started and the flow-control valve is properly set and the pressure in the heater 2 is increased to approximately 72″ Hg absolute after which the supply of outside vapor is discontinued, the heat required to maintain the cycle self-sustaining now being supplied by the compressor. At this pressure, the temperature of the brine leaving the heater 22 and passing to the saturator 3 is in the range of 240° F. to 280° F. and may advantageously be approximately 276° F. and on passing through the saturator, the brine becomes saturated at such temperature with respect to both sodium chloride and calcium sulphate. The brine then passes to the filter 4 where the suspended solids are separated out, after which the brine passes through the control valve 34 into the evaporator 1. Vaporization takes place as the pressure of the brine is reduced and the circulated brine cools to 226° F. As the solubility of sodium chloride in brine is less at 226° F. than at 276° F. and as saturated brine does not become supersaturated upon temperature decrease, the drop in temperature of the brine results in immediate crystallization and precipitation of sodium chloride in the evaporator, but as calcium sulphate is more soluble in saturated brine at 226° F. than at 276° F. there is no precipitation of calcium sulphate in any part of the system. For example, at 260° F. the solubility of calcium sulphate in brine saturated with respect to both sodium chloride and calcium sulphate is approximately three grams of calcium sulphate per litre of brine while at 225° F. the solubility of calcium sulphate in brine saturated with respect to both sodium chloride and calcium sulphate is approximately four grams of calcium sulphate per litre of brine. Due to evaporation of water from the brine in the evaporator, the concentration of calcium sulphate in the brine in the evaporator increases to approximately 3.12 grams per litre which, however, is considerably below the concentration required for saturation and, therefore, there is no crystallization of calcium sulphate anywhere in the system. The vapor rises to the top of the evaporator and is drawn off through the conduit 11 by the compressor 36. By compression, the vapor is heated, after which it is discharged into the heater 2 where it contacts brine drawn from the bottom of the evaporator 1 and supplied to the heater by the pump 26. In the heater, the brine is slightly diluted as well as heated to 276° F. by the compressed vapor so that the solubility of the calcium sulphate is reduced to approximately three grams per litre and the brine becomes again saturated with respect to calcium sulphate so that no further calcium can be dissolved from the rock salt by the brine. The cycle is continued with replenishment of the rock salt in the saturator 3 and the removal of refined salt from the evaporator through the pipe 8.

The process is in the nature of purification by selective crystallization and the most important principles involved are first, recycling the solvent between the saturator 3 and the evaporator 1 with the temperature of the solvent in the saturator being maintained at a higher temperature than exists in the evaporator and, second, recombining the vapor from the evaporator with the solvent at a desirable temperature and pressure before dissolution. In experiments based on this process, there has been used crude salt which analyses at approximately 98% sodium chloride and from the evaporator there has been reclaimed a more cubical type crystallization having a purity of 99.98% sodium chloride. In this particular case, selective crystallization was due to the fact that the solubility of sodium chloride increases with increasing temperature, whereas calcium sulphate is less soluble in brine at high temperature than at low temperature.

In view of the different solubility of calcium sulphate and sodium chloride, only pure salt is crystallized out in the evaporator. The calcium sulphate is mainly left behind in the saturator 3 and although there is calcium sulphate present in the salt solution that goes to the evaporator, it is much below the saturation point of the solution for calcium sulphate and hence will not crystallize out of solution in the evaporator or elsewhere in the system. At temperatures below 176° F. the solubility of calcium sulphate in saturated brine is substantially constant. Therefore, to prevent the precipitation of calcium sulphate in the evaporator, the temperature in the saturator must be at all times maintained above 176° F.

In most evaporator plants, where brine is pumped out of the ground and the water evaporated in multiple effect evaporators, the purity of the finished salt averages a little over 99% sodium chloride and to obtain a salt having a purity in excess of 99.9% sodium chloride, it is necessary chemically to treat the brine before evaporation. The cost of chemical treatment alone as a rule exceeds one dollar per ton of sodium chloride obtained. The steam consumption in multiple effect evaporation is approximately 2200 pounds per ton of salt for quadruple effect and approximately 2600 pounds per ton for triple effect evaporators. Also, the capital investment for evaporator plants is very high. For the practice of the process herein disclosed, the capital investment for equipment is quite low. No heating tubes are required and both the evaporator and saturator may be built of very simple construction and at low capital cost. The power requirement to recrystallize the salt is considerably below that required even for quadruple effect evaporators and no extensive brine treatment as is used in known refining methods is required for the present process. Hence, the procedure has the advantage of low cost equipment and low manufacturing cost to obtain salt of high purity.

A pipe 41 leads from the evaporator 1 through a valve 42 to an open evaporating pan 43 having an overflow channel 44. A pipe 45 leads from the overflow channel 44 to the inlet of a pump 46, the outlet of which is connected through a pipe 47 to the heater 2, flow through this pipe being controlled by a valve 48. Normally, the valves 42 and 48 are closed and the pump 46 is idle. However, by opening the valves 42 and 48 and operating the pump 46, brine may be supplied from the evaporator 1 to the pan 43 in which it is allowed to cool to a temperature of approximately 190° F. after which the cooled brine is returned by the pump 47 to the heater 2. In this way, grainer salt will be produced which will be of greater purity than present commercial grades. The compression of the vapor supplies more heat than is necessary to heat the brine supplied to the heater to the desired temperature, thereby insuring that the overall heat requirements are adequate. The surplus heat supplied by the compressor is utilized to evaporate water from the brine by-passed from the evaporator to the heater by way of the pan 43. The rate of flow through this by-pass is so regulated as to utilize in the evaporation of water from the by-passed liquid only the excess heat supplied by the compressor so that there is no impairment of the heat requirements of the main circulating stream.

Although the procedure has been specifically disclosed herein for refining sodium chloride, it is evident that the procedure can be used for any other types of soluble salts or substances. Also, a solvent other than water may be utilized. In the appended claims, the words "salt" and "salt solution" are to be understood as comprehending soluble substances other than sodium chloride dissolved in a solvent other than water as well as sodium chloride dissolved in water.

We claim:

1. The method of refining salts or other soluble substances which comprises circulating salt solution through a closed system, in one zone heating the salt solution by direct contact with compressed vaporized solvent, passing the heated salt solution at a first predetermined temperature through a second zone containing impure salt thereby saturating said salt solution, maintaining the salt solution at a predetermined pressure in said first and second zones, passing said saturated salt solution into a third zone maintained at a second predetermined pressure less than said first predetermined pressure thereby vaporizing a part of the solvent and reducing the solution temperature below said first predetermined temperature to simultaneously crystallize purified salt out of solution during evolution of vapor therefrom, collecting the purified salt, compressing the vaporized solvent to said first predetermined pressure, removing the residual salt solution from the collected purified salt, subjecting the removed residual salt solution to the pressure maintained in said first zone, returning the residual salt solution to said first zone and supplying the compressed vaporized solvent to said first zone for increasing the temperature of said residual salt solution.

2. The process according to claim 1 characterized by separation of undissolved solids from the salt solution after removal of the saturated solution from the impure salt and prior to vaporization of solvent from the saturated solution.

3. The method according to claim 1 characterized by flowing residual salt solution from said third zone into an open evaporating pan, withdrawing liquid from the upper portion of said evaporator pan and returning the withdrawn liquid to said first zone.

4. The method of obtaining refined salt or other soluble substances which comprises passing unsaturated salt solution at a first predetermined temperature and a first predetermined pressure through a bed of impure salt and thereby effecting saturation of said salt solution at said temperature and pressure, reducing the temperature and pressure of said saturated salt solution to a lower second predetermined temperature and pressure, thereby crystallizing refined salt out of solution while simultaneously vaporizing part of the solvent, collecting the crystallized salt, removing the residual salt solution from the collected crystallized salt, subjecting the removed residual salt solution to said first predetermined pressure, compressing the vaporized solvent to said first predetermined pressure, contacting the compressed vaporized solvent with residual salt solution while said residual salt solution is maintained at said first predetermined pressure to raise the temperature of the latter to said first predetermined temperature and to condense said compressed vapor therein to obtain said unsaturated salt solution.

5. The method of obtaining refined sodium chloride which comprises passing unsaturated brine at a temperature in the range of 240° F. to 280° F. and while under superatmospheric pressure through a bed of impure sodium chloride and thereby effecting saturation of the brine at said temperature, reducing the temperature and pressure of the saturated brine to 226° F. and atmospheric respectively, thereby crystallizing refined sodium chloride out of solution while simultaneously vaporizing water, removing the residual brine from the crystallized sodium chloride, subjecting the removed residual brine to said superatmospheric pressure, compressing the water vapor to a pressure slightly exceeding the vapor pressure of the heated brine and contacting the compressed water vapor with the residual brine while maintained at said superatmospheric pressure to raise the temperature of the latter into the range of 240° F. to 280° F. to obtain said unsaturated brine.

6. The method of refining sodium chloride according to claim 5 characterized by separation of undissolved solids from the brine after removal thereof from said bed of impure sodium chloride and prior to vaporization of water therefrom.

7. The method of separating a first substance whose solubility increases with temperature increase from a mixture of said susbtance and a second substance whose solubility decreases with temperature increase, which method comprises circulating a liquid solvent through a closed system, maintaining said solvent in a first portion of the system at a first predetermined pressure and temperature, contacting said solvent with said mixture during its passage through said portion whereby the solvent leaving said portion is saturated with respect to both said substances, reducing the pressure of the saturated solvent in a second portion of the system thereby vaporizing a portion of said solvent and reducing the temperature of the unvaporized solvent sufficiently partially to precipitate said first substance simultaneously with said vaporizing of said portion of said solvent, collecting the precipitated first substance, removing the residual solvent from said collected precipitated first substance, subjecting the removed residual solvent to the pressure maintained in said first portion of the system, returning the residual solvent to said first portion of the system, collecting and compressing the vaporized solvent and supplying the compressed vapors to the liquid solvent in the first portion of the system for condensation therein to heat the liquid solvent in said first portion of the system.

8. The method according to claim 7 characterized by the removal of solid substances from the solvent after leaving said first portion of the system wherein said solvent is contacted with said substance and prior to the partial vaporization of the solvent.

9. The method of separating sodium chloride from a mixture of sodium chloride and calcium sulphate, which method comprises circulating brine through a closed system, maintaining the brine in a first portion of the system at a temperature exceeding the maximum solubility temperature of calcium sulphate, contacting said brine with said mixture during its passage through said portion whereby the brine leaving said portion is saturated with respect to both sodium chloride and calcium sulphate, reducing the pressure and temperature of said brine in a second portion of the system thereby vaporizing water from said brine and reducing the temperature of the remaining brine to a temperature not less than the point where calcium sulphate reaches saturation to precipitate sodium chloride of high purity simultaneously with said vaporizing of water from said brine, collecting the precipitated sodium chloride, removing the residual brine from the separated sodium chloride, subjecting the removed residual brine to the pressure maintained on said first portion of the system, and returning said removed residual brine to said first portion of the system, collecting and compressing the water vapor and supplying the compressed vapor to the brine in the first portion of the system for condensation therein to heat the brine in said first portion of the system.

10. The method according to claim 9 characterized by the removal of solid substances from the brine after leaving the first portion of the system wherein said brine is contacted with said mixture and prior to the evaporation of water from the brine.

11. Apparatus for refining salt or other soluble substances which comprises a closed system including an evaporator, a heater and a saturator connected in the order named, means for directing circulation of salt solution through said system, the connections to and from said evaporator being so arranged as to withdraw liquid therefrom at a lower level than the level at which the liquid is introduced thereinto, a vapor compressor having its inlet connected to the top of said evaporator and its outlet connected to said heater, means for collecting crystallized salt formed in said evaporator from liquid withdrawn therefrom, a pump having its inlet connected with said evaporator and its outlet connected with said heater and arranged to pump solution from which crystallized salt has been removed by said collecting means, and pressure reducing means arranged to lower the pressure on liquid passed from said saturator to said evaporator, said saturator being adapted to contain a body of impure salt and the connections to and from said saturator being so arranged as to cause liquid flowing therethrough to flow through a body of impure salt contained therein.

12. An apparatus according to claim 11 characterized by an evaporating pan, connections for flowing liquid from the evaporator into said pan, and a connection for withdrawing liquid from the upper portion of said pan and delivering the withdrawn liquid to said heater.

13. An apparatus according to claim 11 characterized by means to regulate the flow in said system responsive to the depth of liquid in said saturator.

14. A method of refining salt or other soluble substance which comprises contacting a soluble salt with a solvent therefor while in one zone maintained at a predetermined temperature and pressure, thereby producing a substantially saturated solution of said salt in said solvent, passing said solution to another zone maintained at a lower pressure at which part of the solvent is vaporized with simultaneous lowering of the temperature of the solution and with simultaneous crystallization of purified salt out of the solution, collecting the purified salt, removing the residual solution from the collected salt, subjecting the removed residual solution to pressure to bring it to the pressure occuring in said first zone and returning it to said first zone, compressing the vaporized solvent, and returning the vaporized solvent to the residual salt solution while the residual salt solution is maintained at a pressure at which the compressed vaporized solvent condenses therein thereby raising the temperature of said solution for contact with said salt in said first zone.

15. A method of refining sodium chloride which comprises contacting impure sodium chloride with brine solution in a first zone to substantially saturate said brine solution with said sodium chloride while said brine solution is maintained under superatmospheric pressure and at a temperature between 240° F. and 280° F., passing said saturated brine solution to another zone maintained at a lower pressure at which water is vaporized from said brine solution with simultaneous lowering of the temperature of said brine solution and with simultaneous crystallization of purified sodium chloride from the brine solution, collecting the purified sodium chloride, removing the residual brine solution from the collected purified sodium chloride, subjecting said removed brine solution to said superatmospheric pressure and returning it to said first zone, collecting and compressing said vaporized water and returning said compressed vaporized water to said removed brine solution while the removed brine solution is at a pressure at which the compressed vaporized water condenses therein thereby raising the temperature of said removed brine solution and adding the resulting condensate thereto for contact with impure salt in said first zone.

16. A method according to claim 15, characterized by separation of undissolved solids from the brine solution after having been passed from said first zone and prior to vaporization of water from the brine solution in said second zone.

CECIL M. HOPPER.
ROMAN B. RICHARDS.

REFERENCES CITED

The following references are of record in the file of this patent:

UNITED STATES PATENTS

| Number | Name | Date |
| --- | --- | --- |
| 351,082 | Williams et al. | Oct. 19, 1886 |
| 743,352 | Trump | Nov. 3, 1903 |
| 1,091,721 | Weil | Mar. 31, 1914 |
| 1,105,387 | Weil | July 28, 1914 |
| 1,261,331 | Weil | Apr. 2, 1918 |
| 1,684,935 | Zalacostas | Sept. 18, 1928 |
| 1,751,740 | Jeremiassen | Mar. 25, 1930 |
| 1,860,741 | Jeremiassen | May 31, 1932 |
| 1,916,825 | Burroughs | July 4, 1933 |
| 2,066,577 | Ritchie et al. | Jan. 5, 1937 |
| 2,288,667 | Allen et al. | July 7, 1942 |